United States Patent
Van Dingenen et al.

(10) Patent No.: US 11,590,842 B1
(45) Date of Patent: Feb. 28, 2023

(54) TRANSMISSION WITH POWER TAKE-OFF

(71) Applicant: Dana Belgium N.V., Flanders (BE)

(72) Inventors: Joachim Van Dingenen, Drongen (BE); Jessica Versini, Bruges (BE); Kurt Cattoor, Koolkerke (BE); Marc Van Tomme, Roeselare (BE); Filip D. Schacht, Meulebeke (BE); Bert Hannon, Bruges (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/646,267

(22) Filed: Dec. 28, 2021

(51) Int. Cl.
| | | |
|---|---|---|
| *B60K 17/28* | (2006.01) | |
| *B60K 6/48* | (2007.10) | |
| *B60K 6/547* | (2007.10) | |
| *B60K 6/365* | (2007.10) | |
| *B60K 6/40* | (2007.10) | |
| *B60K 6/26* | (2007.10) | |

(52) U.S. Cl.
CPC .............. *B60K 17/28* (2013.01); *B60K 6/365* (2013.01); *B60K 6/40* (2013.01); *B60K 6/48* (2013.01); *B60K 6/547* (2013.01); *B60K 2006/268* (2013.01)

(58) Field of Classification Search
None
See application file for complete search history.

(56) References Cited

U.S. PATENT DOCUMENTS

| | | | | |
|---|---|---|---|---|
| 7,395,837 | B2* | 7/2008 | Foster | F16H 3/728 475/5 |
| 7,766,109 | B2* | 8/2010 | Thompson | B60W 10/06 180/65.265 |
| 7,980,980 | B2* | 7/2011 | Rask | F16H 3/728 477/3 |
| 8,262,524 | B2* | 9/2012 | Rask | F16H 3/728 475/5 |
| 9,428,042 | B2* | 8/2016 | Morrow | B60K 6/52 |
| 11,009,111 | B2* | 5/2021 | Beck | B60K 6/387 |
| 11,137,053 | B2* | 10/2021 | Steinberger | B60K 6/387 |
| 11,247,563 | B2* | 2/2022 | Van Dingenen | B60K 6/445 |
| 11,441,645 | B2* | 9/2022 | Van Dingenen | B60K 25/00 |
| 2021/0018072 | A1 | 1/2021 | Steinberger et al. | |
| 2021/0339625 | A1 | 11/2021 | Epple et al. | |
| 2021/0362593 | A1 | 11/2021 | Van Dingenen et al. | |
| 2021/0364065 | A1 | 11/2021 | Van Dingenen et al. | |
| 2022/0340001 | A1* | 10/2022 | Sagmeister | B60K 6/40 |

OTHER PUBLICATIONS

Goossens, S. et al., "Systems and Methods for Torque Output Control," U.S. Appl. No. 17/457,389, filed Dec. 2, 2021, 33 pages.
Goossens, S. et al., "Systems and Methods for Vehicle Hill Control," U.S. Appl. No. 17/457,612, filed Dec. 3, 2021, 34 pages.

* cited by examiner

*Primary Examiner* — Dirk Wright
(74) *Attorney, Agent, or Firm* — McCoy Russell LLP (57) ABSTRACT

A method and system for operating a transmission that includes two power take off devices is described. In one example, an internal combustion engine and/or an electric machine may supply power to accessory devices via first and second power take off devices. Alternatively, power may be delivered to the transmission via one or both of the first and second power take off devices.

20 Claims, 5 Drawing Sheets

TRANSMISSION WITH POWER TAKE-OFF

TECHNICAL FIELD

The present disclosure relates to a transmission that includes power take-off ports for driving loads that may be coupled directly to the driveline via gears. The loads may include loads that are onboard the vehicle and loads that are off board the vehicle.

BACKGROUND AND SUMMARY

A vehicle may include a transmission that includes a power take off. The power take off may transfer torque from an engine to a device that is coupled to a transmission. U.S. Patent Publication Number 2021/0339625 shows one example of a transmission power take off that may deliver power to a load other than vehicle wheels. In this particular example, the power take off output shaft may rotate at a fixed multiple of a rotational rate of an input shaft of the power take off. The input shaft of the power take off may be coupled to an output shaft of a transmission. The power take off may deliver engine torque solely to vehicle wheels, solely to an accessory device (e.g., a pump) that does not provide propulsive effort to the vehicle wheels, or to vehicle wheels and the accessory device. However, all accessories that are coupled to the power take off rotate at a same speed, which may lower efficiency of some accessories. Alternatively, external gearing/pulleys may be needed to operate different accessories at different speeds. Consequently, packaging of system components and system complexity may be increased.

The inventors herein have recognized the above-mentioned issues and have developed a transmission, comprising: a first power take off port including a shaft that rotates at a multiple of a rotational rate of a transmission input shaft; an output shaft configured to deliver power to vehicle wheels, the output shaft directly coupled to carrier of a first planetary gear set; and a second power take off port, the second power take off port directly coupled to a sun gear of the first planetary gear set.

By directly coupling an output shaft of a transmission to a carrier of the first planetary gear and coupling a second power take off port directly to a sun gear of the first planetary gear set, it may be possible to provide the technical result of rotating accessories that are coupled to the second power take off at different speeds than the output shaft of the transmission. Consequently, it may be possible for the accessories to operate with greater efficiency. In addition, accessories that are driven via the second power take off port may be designed to operate as speeds that may be different from speeds of accessories that are driven via a first power take off port. The first power take off port may rotate at a multiple of a rate that an input shaft of the transmission rotates. Further, gearing of power take off outputs is within the transmission so system complexity may be reduced and system packaging may be more compact.

The present description may provide several advantages. In particular, the approach herein includes a transmission with two power take offs that may rotate at different speeds to drive different types of loads. In addition, the approach allows a first power take off to be driven in all modes while the second power take off may be driven in select modes so that the system has greater flexibility. Further, the first and second power take offs may be driven independently or together via one or more electric machines to further increase system flexibility.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
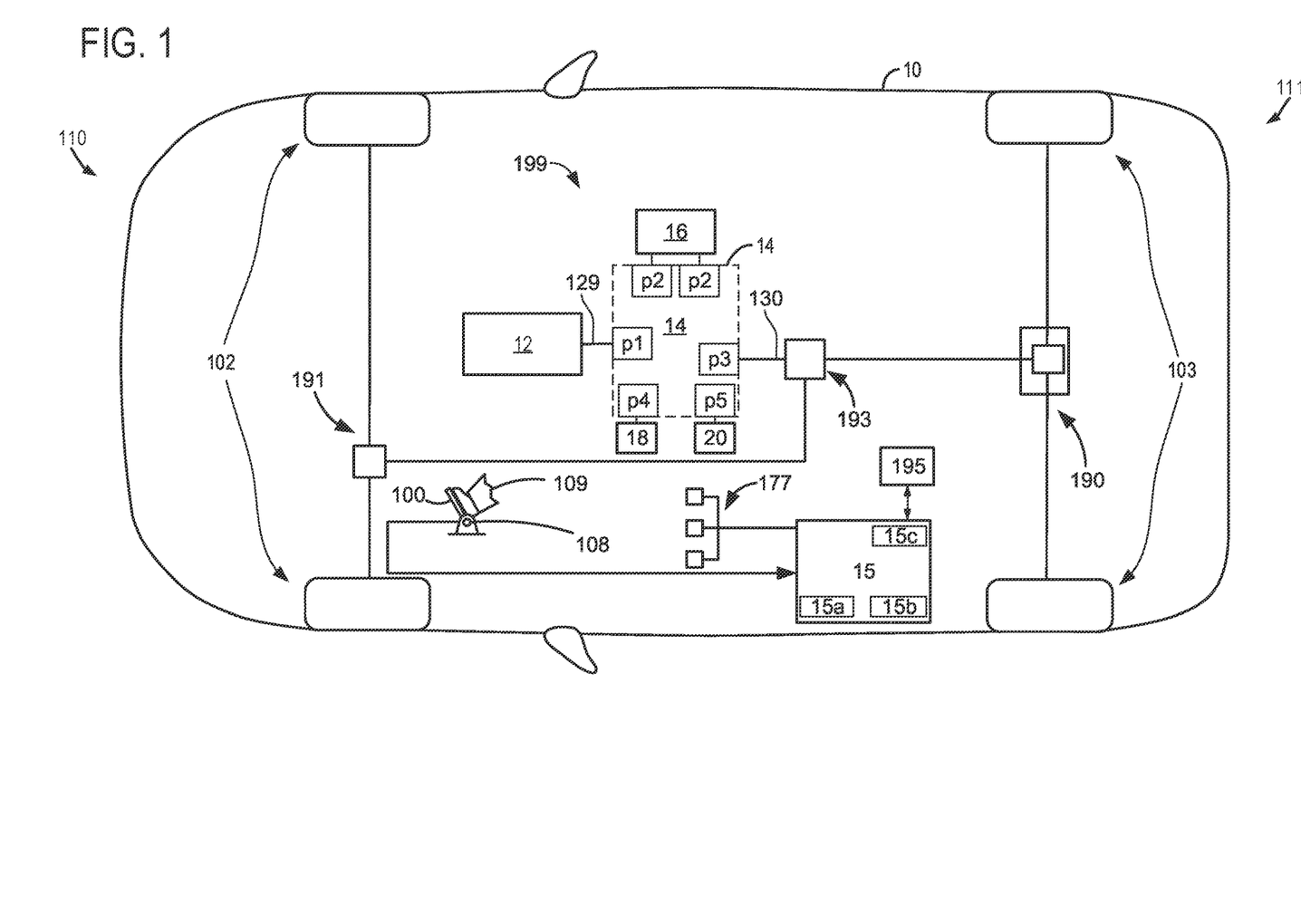
FIG. 1 is a schematic diagram of an example vehicle driveline that includes a transmission.
Figure 2:
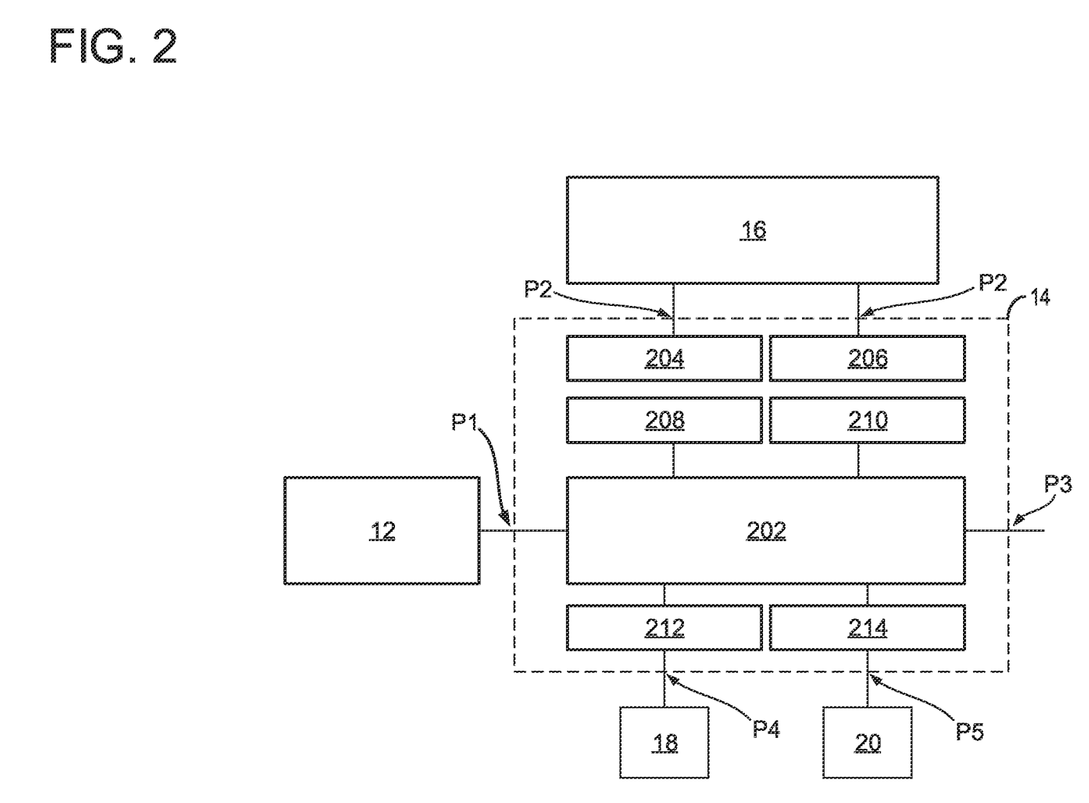
FIG. 2 a block diagram of an example transmission.
Figure 3:
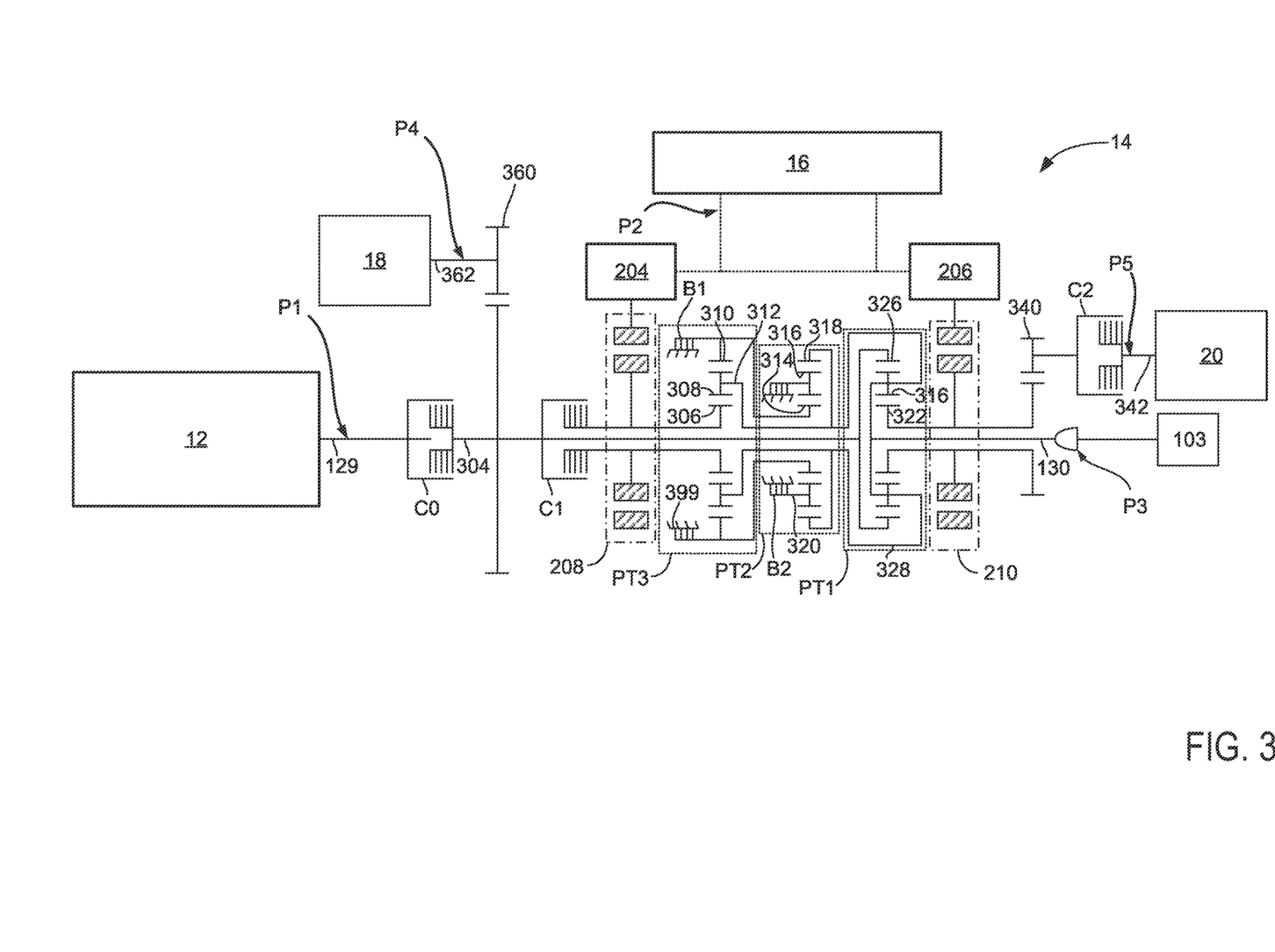
FIG. 3 shows a detailed schematic of a transmission.
Figure 4:
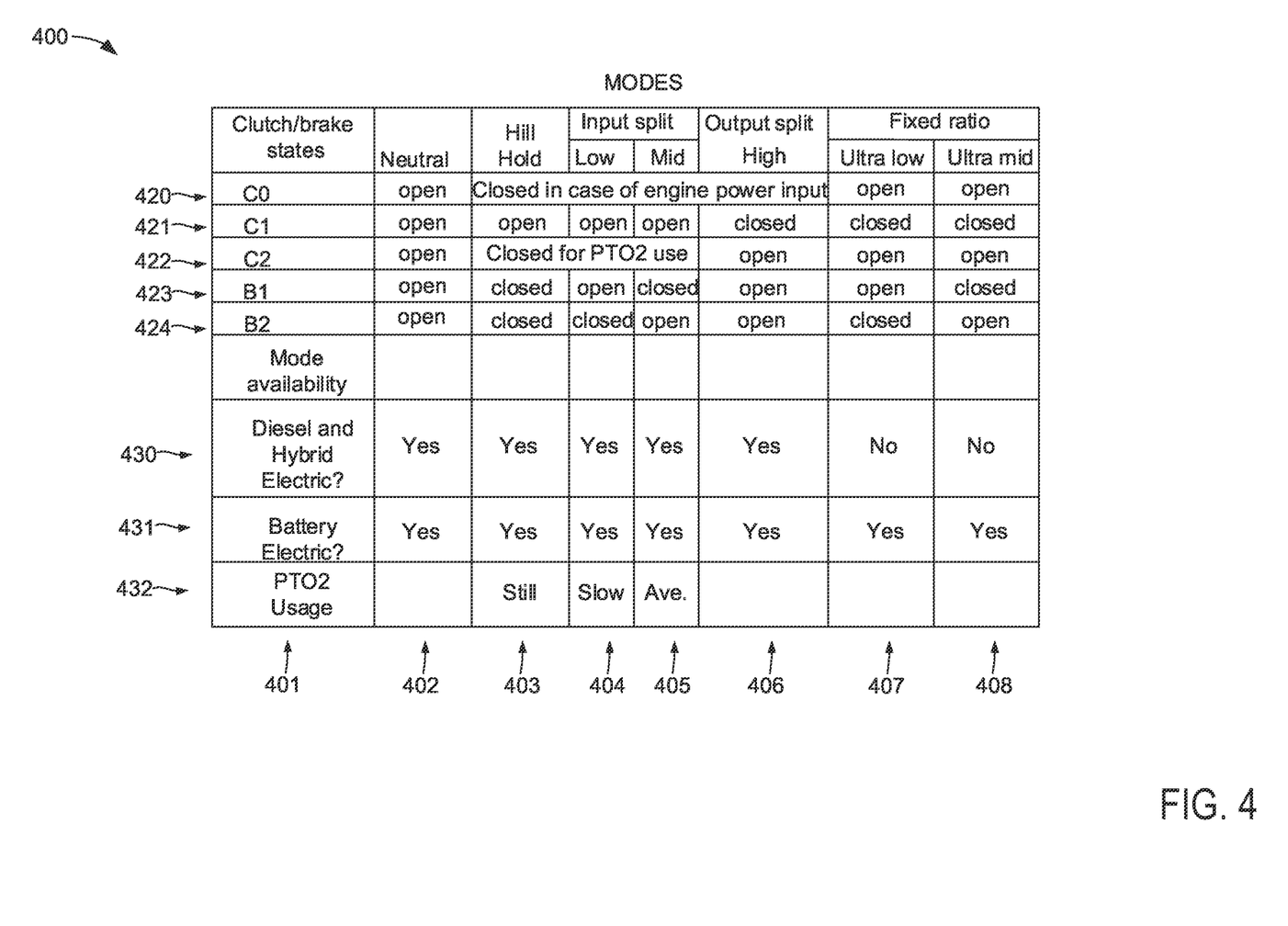
FIG. 4 shows a table of transmission modes.

The following description relates to systems and methods for operating a transmission. The transmission may include two power take off ports that may be driven via an external power source or via an electric machine that is included in the transmission. The transmission may be included in a vehicle as shown in FIG. 1. The transmission may be configured as shown in FIG. 2. The transmission may include the components that are shown in FIG. 3. The transmission may have a plurality of operating modes as shown in FIG. 4. The transmission may be operated according to the method shown in the flowchart of FIG. 5.

FIG. 1 illustrates an example vehicle driveline 199 included in vehicle 10. Vehicle 10 includes a front side 110 and a rear side 111. Vehicle 10 includes front wheels 102 and rear wheels 103. Vehicle 10 includes a propulsion source 12 (e.g., internal combustion engine or electric machine) that may selectively provide propulsive effort to front axle 191 and rear axle 190. In other examples, the propulsion source 12 may provide propulsive effort only to front axle 191 or only to rear axle 190. Propulsion source 12 is shown mechanically coupled to transmission 14 via transmission input shaft 129. In some examples, the engine's crankshaft (not shown) may be coupled to transmission input shaft 129. Transfer case 193 routes mechanical power from transmission output shaft 130 to front axle 191 and rear axle 190.

Electric energy storage device 16 (e.g., a traction battery or capacitor) may provide electric power to electric machines included in transmission 14. Transmission 14 may supply mechanical power to mechanically driven accessories 18 and 20. Transmission 14 may be operated via controller 15. In this example, controller 15 is configured to command electric machines (not shown), clutches (not shown), and brakes (not shown) within transmission 14. Controller 15 may switch operating modes of transmission 14 via adjusting states of clutches and brakes as indicated in FIG. 4. Controller 15 may also receive a position of a driver demand pedal 100 from driver demand pedal position sensor 108, which may be an input for determining the operating state of transmission 14. The driver demand pedal 100 and the driver demand pedal position sensor 108 may react to movement caused by human driver 109. Controller 15 may receive data from sensors 177. Sensors 177 may include, but are not limited to a vehicle speed sensor, a transmission temperature sensor, transmission input shaft speed sensor, transmission output shaft speed sensor, and ambient temperature sensor. Controller 15 includes a processor 15a for executing instructions, read-only memory 15b, and random access memory 15c. In this example, a single controller 15 is shown, but in other examples several controllers may operate together in a distributed system to perform the methods described herein. Controller 15 may receive input from and provide output to human/machine interface 195 (e.g., touch screen display, pushbuttons, etc.).

Referring now to FIG. 2, a block diagram of transmission 14 is shown. Transmission 14 is shown with 5 ports that are labeled P1-P5. Port 1 is configured to receive mechanical energy from an external power source 12 (e.g., internal combustion engine or electric machine). Alternatively, port 1 may deliver mechanical energy to external power source 12. Port 2 is a port that receives electrical power from electric energy storage device 16. Alternatively, port 2 may provide electrical power to electric energy storage device 1. Electrical ports 2 are shown coupled to a first inverter 206 and a second inverter 204. First inverter 206 may convert direct current (DC) to alternating current (AC). AC may be delivered from first inverter 206 to first electric machine 210. Likewise, AC may be delivered from second inverter 204 to second electric machine 208. Alternatively, first and second electric machines 206 and 208 may deliver AC power to inverters 206 and 204. Electric machines 210 and 208 may supply mechanical power to gears, clutches, and brakes 202. Gears, clutches, and brakes 202 may transfer mechanical power to output ports P3-P5. Output port P3 may transfer mechanical power to wheels 103. Output port P4 may transfer mechanical power to power take off (PTO 1) 212 and accessories 18, the accessories 18 not including vehicle wheels. Output port P5 may transfer mechanical power to power take off (PTO 2) 214 and accessories 20, the accessories 20 not including vehicle wheels.

Turning now to FIG. 3, a detailed view of one example of transmission 14 is shown. In this example, propulsion source 12 is shown coupled to transmission input shaft 129. Transmission input shaft 129 is coupled to clutch C0 and clutch C0 may selectively couple transmission input shaft 129 to connecting shaft 304. Clutch C0 is directly coupled to ring gear 326 of first planetary gear set PT1 and PTO 1 gear 360 via connecting shaft 304. PTO 1 gear 360 may be coupled to accessories 18 via PTO 1 shaft 362. First planetary gear set PT1 also includes planetary gears 316 and a sun gear 322. Sun gear 322 is shown coupled to PTO 2 gear 340 and electric machine 210. Planetary gears 316 couple sun gear 322 to ring gear 326. Carrier 328 supports planetary gears 316. PTO 2 gear 340 may be selectively coupled to PTO 2 output shaft 342 via PTO 2 clutch C2. PTO 2 output shaft 342 may be coupled to accessories 20.

Connecting shaft 304 may be selectively coupled to electric machine 208 and sun gear 306 of third planetary gear set PT3 via closing input coupled clutch C1. Sun gear 306 of third planetary gear set PT3 is coupled to planetary gears 308. Planetary gears 308 are coupled to ring gear 310, and planetary gears 308 are supported via carrier 312. Planetary gears 308 are coupled to ring gear 318 of second planetary gear set PT2 and planetary gears 316 of first planetary gear set PT1 via carrier 312 of third planetary gear set PT3 and carrier 328 of first planetary gear set PT1. Carrier 328 of first planetary gear set PT1 is coupled to wheels 103 via transmission output shaft 130. Brake B1 may be closed to ground or couple ring gear 310 of third planetary gear set PT3 to transmission housing 399.

Second planetary gear set PT2 includes a sun gear 314 that is coupled to ring gear 310 of first planetary gear set PT1. Planetary gears 308 of second planetary gear set PT2 are coupled to sun gear 314 of planetary gear set PT2 and ring gear 318 of second planetary gear set PT2. Brake B2 may be closed to ground or couple carrier 320 of second planetary gear set PT2 to transmission housing 399.

PTO 1 is directly coupled to connecting shaft 304. Therefore, whenever connecting shaft 304 is rotating, PTO 1 output shaft 362 rotates. PTO 1 output shaft 362 may be rotated via closing clutch C0 when propulsion source 12 is rotating. PTO 1 may also be rotated via electric machine 208 by closing clutch C1. PTO 1 may rotate in any of the modes that are shown in the table of FIG. 4.

PTO 2 may rotate and provide mechanical power to accessories 20 during three modes as indicated in FIG. 4. In a hill hold mode, brakes B1 and B2 may be closed to lock rotation of transmission output shaft 130 and PTO 2 output shaft 342 may be rotated via torque generated via electric machine 210 and/or propulsion source 12. In this way, PTO 2 output shaft 342 may rotate at a speed that is a multiple of a rotational speed of propulsion source 12 and connecting shaft 304.

PTO 2 output shaft 342 may be rotated when clutch C1 is open, C2 is closed, and C0 is open or closed. PTO 2 output shaft 342 may also provide mechanical torque to accessories 20 when brake B1 is open, B2 is closed, C1 is open, C2 is closed and C0 is open or closed. Applying brake B2 prevents rotation of carrier 320 so that when propulsion source 12 or electric machine 208 drive the transmission output shaft 130 via connecting shaft 304, second planetary gear set PT2, and first planetary gear set PT1, PTO 2 gear 340 may rotate. Energy may flow from propulsion source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO 2 gear 340 to rotate. PTO2 output shaft 342 may rotate when clutch C2 is closed.

PTO 2 output shaft 342 may also be rotated when clutch C1 is open, C2 is closed, and C0 is open or closed. PTO 2 output shaft 342 may also provide mechanical torque to accessories 20 when brake B1 is closed, B2 is open, C1 is open, C2 is closed and C0 is open or closed. Applying brake B1 prevents rotation of ring gear 310 and sun gear 306. Energy may flow from propulsion source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO 2 gear 340 to rotate. PTO2 output shaft 342 may rotate when clutch C2 is closed.

Thus the system of FIGS. 1-3 may provide for a transmission, comprising: a first power take off port including a power take off shaft that rotates at a multiple of a rotational rate of a first shaft, the first shaft coupled to a first planetary gear set; a second shaft configured to deliver power to vehicle wheels, the second shaft coupled to planetary gears of the first planetary gear set; and a second power take off port, the second power take off port coupled to a sun gear of the first planetary gear set. In a first example, the transmission further comprises a first electric machine and a second electric machine. In a second example that may include the first example, the transmission further comprises a second planetary gear set and a third planetary gear set. In a third example that may include the one or more of the first and second examples, the transmission further comprises a first clutch configured to decouple the second power take off port from the sun gear of the first planetary gear set. In a fourth example that may include one or more of the first, second, and third examples, the transmission further comprises a second clutch configured to decouple a power source from the first shaft. In a fifth example that may include one or more of the first through fourth examples, the transmission includes where the second shaft is directly coupled to planetary gears of the first planetary gear set. In a sixth example, that may include one or more of the first through fifth examples, the transmission includes where the second power take off port is directly coupled to the sun gear of the first planetary gear set.

Thus, the system of FIGS. 1-3 also provides for a transmission, comprising: a first power take off port including a power take off shaft that rotates at a multiple of a rotational rate of a first shaft, the first shaft coupled to a first planetary gear set; a second shaft configured to deliver power to vehicle wheels, the second shaft coupled to planetary gears of the first planetary gear set; a second power take off port, the second power take off port coupled to a sun gear of the first planetary gear set; two brakes; and a controller including executable instructions stored in non-transitory memory that cause the controller to adjust operating states of the two brakes to deliver power via the second power take off. In a first example, the transmission may include where the first of the two brakes is directly coupled to a ring gear of a third planetary gear set. In a second example that may include the first example, the transmission includes where the second of the two brakes is directly coupled to a carrier of a second planetary gear set. In a third example, that may include one or both of the first and second examples, the transmission further comprises additional instructions to adjust an operating state of a clutch to transfer torque from a power source to vehicle wheels. In a fourth example that may include one or more of the first through third examples, the transmission further comprises additional instructions to adjust an operating state of a clutch to transfer torque to an accessory device via the second power take off.

Referring now to FIG. 4, a table 400 that illustrates transmission modes that are available is shown. Table 400 also indicates ways in which particular transmission modes may be activated. In addition, table 400 indicates transmission modes in which PTO 2 is available to provide output torque.

Table 400 includes columns 402-408 that indicate available transmission modes. Column 401 indicates transmission actuator states and mode availability for when the transmission is applied in diesel electric, hybrid electric, and battery electric configurations. Rows 420-424 describe clutch and brakes included in transmission 14. The states of clutches and brakes to enter a particular mode and indicated in rows and columns to the right of column 401. Row 430 indicates whether or not diesel electric and hybrid electric modes are available for the given transmission modes. Row 431 indicates whether or not battery electric mode is available for the given transmission modes. Row 432 indicates whether or not PTO 2 is available for the given transmission modes. If a particular row and column is vacant, the feature or mode is not available For example, low range mode (column 404) may be activated via opening clutch C1, opening brake B1, closing brake B2, and opening or closing clutches C0 and C2. PTO 2 output is available in low range mode when clutch C2 is closed. A propulsion source may provide energy to transmission 14 when clutch C0 is closed. The transmission may be operating in a power split configuration when the transmission is in the low range. In another example, the transmission 14 may be operated in a high speed power split mode (column 406) when clutch C1 is closed, clutch C2 is open, brake B1 is open, and brake B2 is open. Clutch C0 may be closed when the external propulsion source is activated. Output from PTO 2 is not available when the transmission 14 is operated in power split high speed mode.

Figure 5:
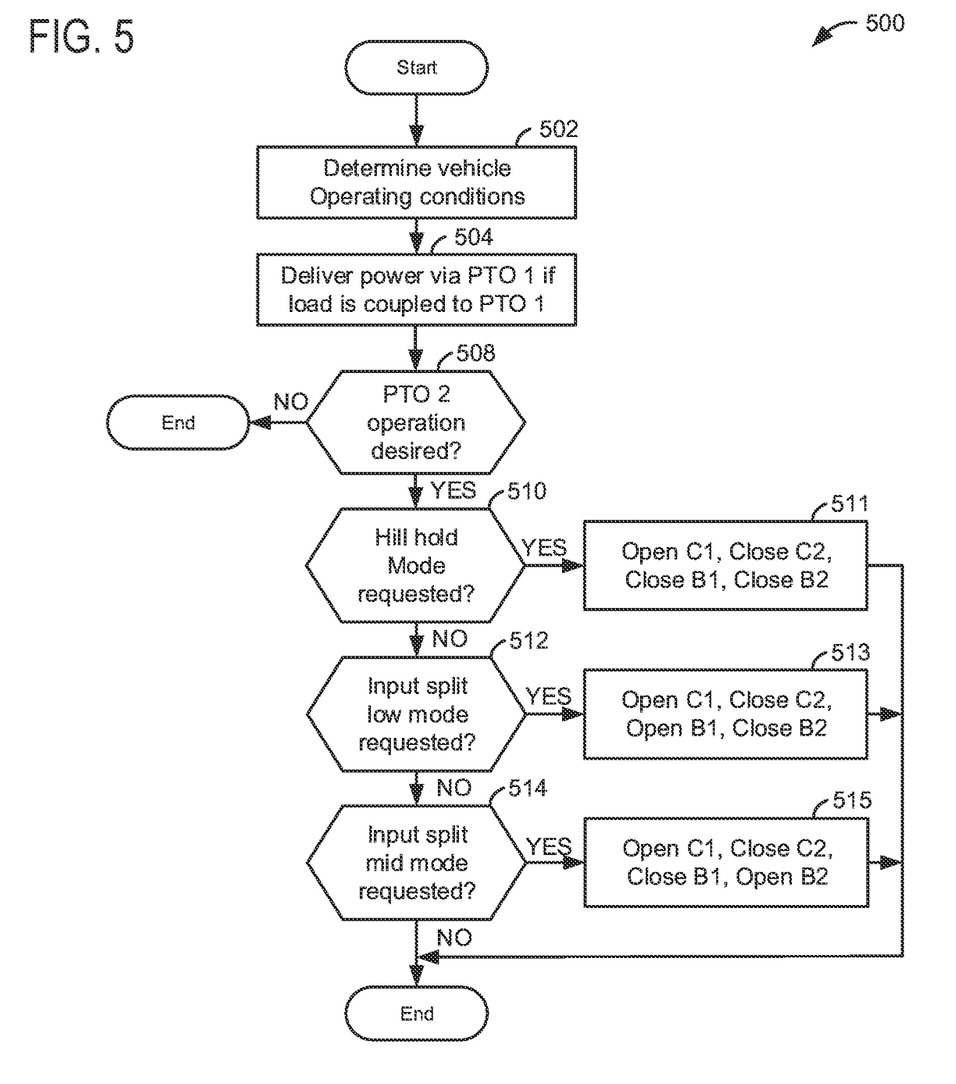
FIG. 5 shows a flowchart of a method for operating a transmission.

Referring now to FIG. 5, an example method for operating a transmission that includes at least one power take off (PTO) is shown. Method 500 may be at least partially implemented as executable instructions stored in controller memory in the system of FIGS. 1-3. Further, method 500 may include actions taken in the physical world to transform an operating state of the system of FIGS. 1-3. Additionally, method 500 may provide at least some of the operating states shown in FIG. 4.

At 502, method 500 determines vehicle operating conditions. Vehicle operating conditions may include, but are not limited to driver demand torque/power, vehicle speed, and transmission temperature. The vehicle operating conditions may be determined from the vehicle's sensors. The driver demand may be determined based on a position of the driver demand pedal. Method 500 proceeds to 504.

At 504, method 500 delivers mechanical power to power take off PTO 1 if a load is mechanically coupled to PTO1 if the transmission is not engaged in neutral. Method 500 proceeds to 508.

At 508, method 500 judges whether or not operation of PTO 2 is requested and if PTO 2 is available in the present transmission mode. Operation of PTO 2 may be requested based on user input to human/machine interface 195 or via a controller based on vehicle operating conditions. Operation of PTO 2 may be provided in select modes as indicated in table 400 of FIG. 4. If method 500 judges that PTO 2 is to be activated, the answer is yes and method 500 proceeds to 510. Otherwise, the answer is no and method 500 proceeds to exit.

At 510, method 500 judges if the transmission 14 is to be operated in a hill hold mode. Method 500 may judge that the transmission is to be operated in a hill hold mode if a transmission shifter is placed in park, or if other select vehicle operating conditions are present. If method 500 judge that the transmission is to be operated in hill hold mode, the answer is yes and method 500 proceeds to 511.

At 511, method 500 opens clutch C1, closes clutch C2, closes brake B1, and closes brake B2 to activate PTO 2. In this mode, a rotational speed of PTO 2 is proportional to a rotational speed of the propulsion source. In other words, the speed of PTO 2 is a multiple of the rotational speed of the propulsion source. Thus, for an engine speed range of 1200-2100 RPM, PTO 2 speed may be 2200-4000 RPM. Method 500 proceeds to exit.

At 512, method 500 judges if the transmission 14 is to be operated in a power split low range mode. Method 500 may judge that the transmission is to be operated in a power split low range mode based on an operating state of a transmission shifter, or if other select vehicle operating conditions are present. If method 500 judge that the transmission is to be operated in a power split low range mode, the answer is yes and method 500 proceeds to 513.

At 513, method 500 opens clutch C1, closes clutch C2, opens brake B1, and closes brake B2 to activate PTO 2. In this mode, a rotational speed of PTO 2 is controlled to a requested speed via adjusting engine speed. For example, for an engine speed of between 1200-2100 RPM, PTO 2 speed may be 1500-3200 RPM. The speed of PTO 2 depends on the transmission output shaft speed. The transmission input shaft speed may be adjusted to reach a desired speed for PTO 2. If the transmission output shaft speed changes, the transmission input shaft speed is changed to hold speed of PTO 2 constant. Method 500 proceeds to exit.

At 514, method 500 judges if the transmission 14 is to be operated in a power split MID range mode. Method 500 may judge that the transmission is to be operated in a power split MID range mode based on an operating state of a transmission shifter. If method 500 judge that the transmission is to be operated in a power split middle range mode, the answer is yes and method 500 proceeds to 515.

At 515, method 500 opens clutch C1, closes clutch C2, closes brake B1, and opens brake B2 to activate PTO 2. In this mode, a rotational speed of PTO 2 is controlled to a requested speed via adjusting engine speed. For example, for an engine speed of between 1200-2100 RPM, PTO 2 speed may be 100-1800 RPM. The speed of PTO 2 depends on the transmission output shaft speed. The transmission input shaft speed may be adjusted to reach a desired speed for PTO 2. If the transmission output shaft speed changes, the transmission input shaft speed is changed to hold speed of PTO 2 constant. Method 500 proceeds to exit.

Thus, the method of FIG. 5 provides for a method for operating a transmission, comprising: receiving energy to the transmission, the transmission including a first power take off and a second power take off, the first power take off coupled to a first planetary gear set, the second power take off selectively coupled to the first planetary gear set via a power take off clutch; and rotating a shaft of the first power take off while rotating a shaft of the second power take off at a different speed than a rotational speed of the first power take off. In a first example, the method for operating the transmission may include where the energy is electric energy, and further comprising: generating torque via an electric machine in the transmission to rotate the shaft of the second power take off. In a second example that may include the first example, the method for operating the transmission includes where the energy is mechanical energy, the mechanical energy generated via an internal combustion engine. In a third example that may include one or both of the first and second examples, the method for operating the transmission further comprises closing the power take off clutch and applying two brakes in the transmission to deliver rotational output from the second power take off. In a fourth example that may include one or more of the first, second, and third examples, the method for operating the transmission further comprises closing the power take off clutch and applying a first brake and not applying a second brake in the transmission to deliver rotational output from the second power take off. In a fifth example that may include one or more of the first, second, third, and fourth examples, the method for operating the transmission includes where the second brake is directly coupled to a carrier of a second planetary gear set. In a sixth example that may include one or more of the first, second, third, fourth, and fifth examples, the method for operating the transmission includes where the first brake is directly coupled to a ring gear of a third planetary gear set. In a seventh example that may include one or more of the first, second, third, fourth, fifth, and sixth examples, the method for operating the transmission further comprises delivering power to vehicle wheels via the transmission while rotating the shaft of the second power take off.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission, comprising:
a first power take off port including a power take off shaft that rotates at a multiple of a rotational rate of a first shaft, the first shaft coupled to a first planetary gear set;
a second shaft configured to deliver power to vehicle wheels, the second shaft coupled to planetary gears of the first planetary gear set; and
a second power take off port, the second power take off port coupled to a sun gear of the first planetary gear set.

2. The transmission of claim 1, further comprising a first electric machine and a second electric machine.

3. The transmission of claim 2, further comprising a second planetary gear set and a third planetary gear set.

4. The transmission of claim 3, further comprising a first clutch configured to decouple the second power take off port from the sun gear of the first planetary gear set.

5. The transmission of claim 4, further comprising a second clutch configured to decouple a power source from the first shaft.

6. The transmission of claim 5, where the second shaft is directly coupled to planetary gears of the first planetary gear set.

7. The transmission of claim 1, where the second power take off port is directly coupled to the sun gear of the first planetary gear set.

8. A method for operating a transmission, comprising:
receiving energy to the transmission, the transmission including a first power take off and a second power take off, the first power take off coupled to a first planetary gear set, the second power take off selectively coupled to the first planetary gear set via a power take off clutch; and
rotating a shaft of the first power take off while rotating a shaft of the second power take off at a different speed than a rotational speed of the first power take off.

9. The method for operating the transmission of claim 8, where the energy is electric energy, and further comprising:
generating torque via an electric machine in the transmission to rotate the shaft of the second power take off.

10. The method for operating the transmission of claim 8, where the energy is mechanical energy, the mechanical energy generated via an internal combustion engine.

11. The method for operating the transmission of claim 8, further comprising closing the power take off clutch and applying two brakes in the transmission to deliver rotational output from the second power take off.

12. The method for operating the transmission of claim 8, further comprising closing the power take off clutch and applying a first brake and not applying a second brake in the transmission to deliver rotational output from the second power take off.

13. The method for operating the transmission of claim 12, where the second brake is directly coupled to a carrier of a second planetary gear set.

14. The method for operating the transmission of claim 13, where the first brake is directly coupled to a ring gear of a third planetary gear set.

15. The method for operating the transmission of claim 8, further comprising delivering power to vehicle wheels via the transmission while rotating the shaft of the second power take off.

16. A transmission, comprising:
a first power take off port including a power take off shaft that rotates at a multiple of a rotational rate of a first shaft, the first shaft coupled to a first planetary gear set;
a second shaft configured to deliver power to vehicle wheels, the second shaft coupled to planetary gears of the first planetary gear set;
a second power take off port, the second power take off port coupled to a sun gear of the first planetary gear set;
two brakes; and
a controller including executable instructions stored in non-transitory memory that cause the controller to adjust operating states of the two brakes to deliver power via the second power take off.

17. The transmission of claim 16, where the first of the two brakes is directly coupled to a ring gear of a third planetary gear set.

18. The transmission of claim 17, where the second of the two brakes is directly coupled to a carrier of a second planetary gear set.

19. The transmission of claim 16, further comprising additional instructions to adjust an operating state of a clutch to transfer torque from a power source to vehicle wheels.

20. The transmission of claim 16, further comprising additional instructions to adjust an operating state of a clutch to transfer torque to an accessory device via the second power take off.

* * * * *